March 20, 1962    J. J. BARCELLONA ETAL    3,026,071
CONTAINER

Filed July 30, 1957    4 Sheets-Sheet 1

INVENTORS
JOSEPH J. BARCELLONA
ALBERT J. LECHNER
By George C. Sullivan
Agent

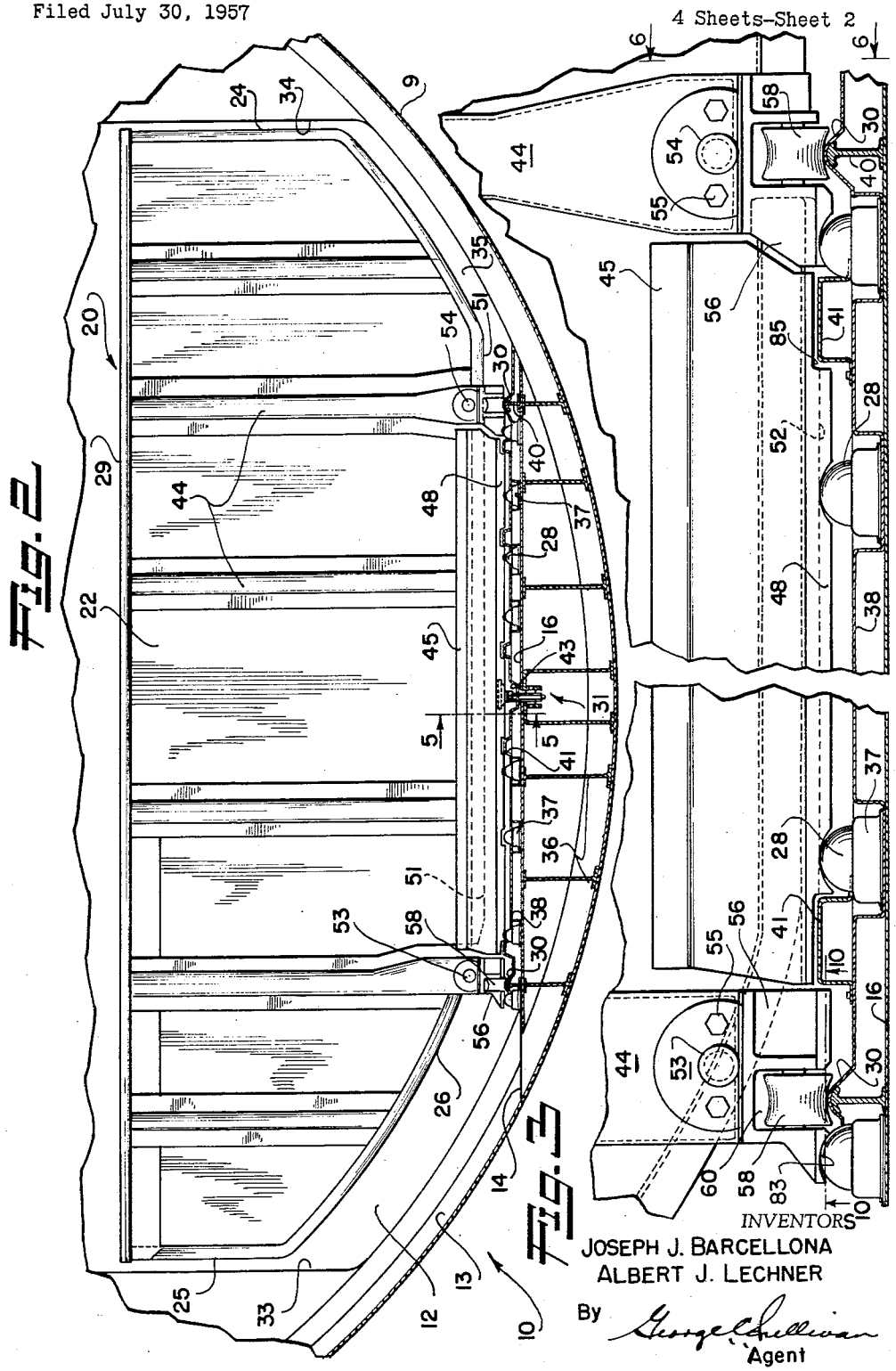

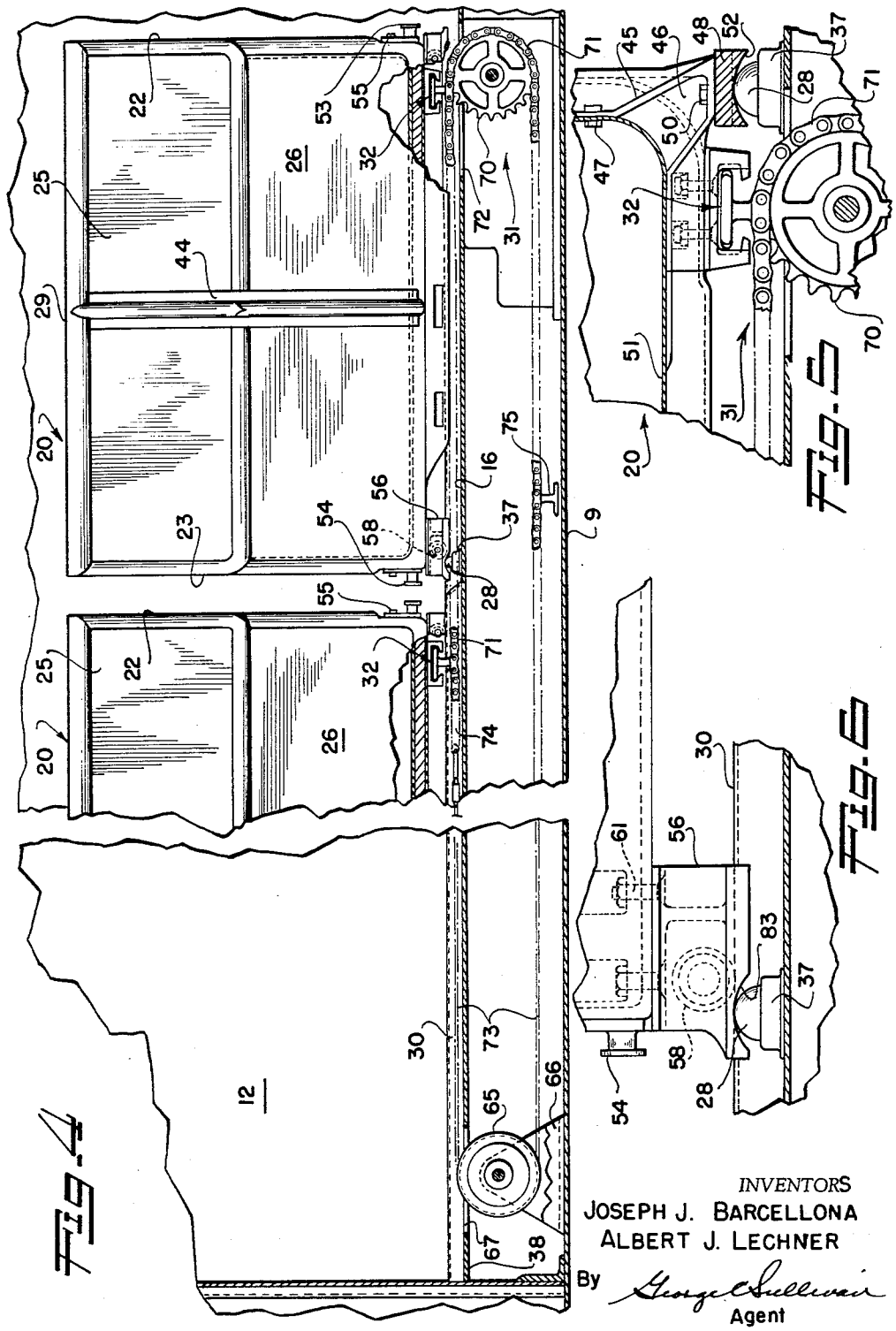

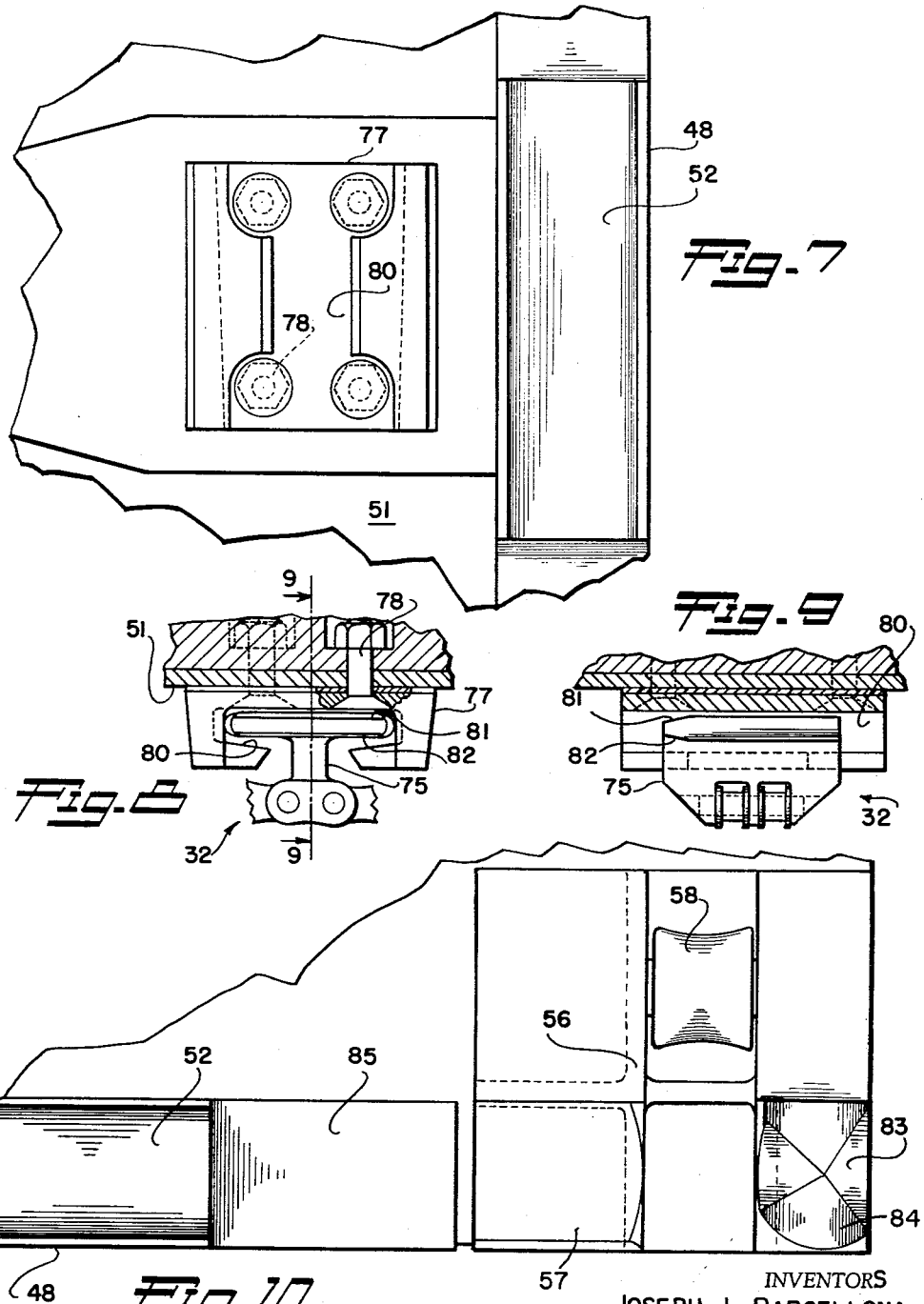

United States Patent Office 3,026,071
Patented Mar. 20, 1962

3,026,071
CONTAINER
Joseph J. Barcellona, Woodland Hills, and Albert J. Lechner, North Hollywood, Calif., assignors to Lockheed Aircraft Corporation, Burbank, Calif.
Filed July 30, 1957, Ser. No. 675,092
8 Claims. (Cl. 244—137)

This invention relates to cargo carrying apparatus and more particularly to a container for carrying light weight parcels, such as baggage, which is readily traversable for convenient manual semi-automatic or automatic loading and unloading operations with respect to a cargo compartment of a vehicle.

Heretofore, it has been the conventional practice to load and unload light weight parcels, such as passenger personal baggage, into and out of cargo compartments by manual means. For example, when a passenger checks his baggage at a ticket counter prior to embarkation, the individual pieces of baggage are manually moved by a baggage handler to a cart which transports the baggage to the vehicle followed by the manual removal of the baggage from the cart so it can be stowed into the vehicle. Usually, in case of airplanes, where the cargo compartment is located a substantial distance from the ground, a second baggage handler is employed who receives individual pieces of baggage from the first handler and who stacks or otherwise disposes of the baggage within the cargo compartment.

Difficulties have been encountered when manually loading and unloading individual personal baggage, for example, by the above mentioned conventional "bucket brigade" type of handling operation which are due mainly to the fact that some pieces of baggage are lost or damaged and because the time required to load and unload by hand is quite time consuming for commercial transport operations. These difficulties have led to the employment of pre-loaded baggage systems which generally comprise the use of a plurality of containers which are initially loaded at the transport terminal with individual pieces of baggage, transporting the loaded containers to the vehicle and mechanically lifting the containers into the stowage compartment. The containers are secured to the vehicle and are carried by the vehicle to various passenger destinations. Upon arrival at certain destinations, the containers are mechanically removed from the vehicle and the individual pieces of baggage are unloaded upon presentation of claiming tickets at the terminal.

To employ such a pre-loaded baggage system or the like as described above, it is to be noted that ordinary or conventional type boxes or containing means are unsuitable since the containing means should be of light weight, reinforced and susceptible to be automatically lifted to and from the floor of a cargo or storage compartment and adaptable to be moved transversely and longitudinally over the cargo floor by automatic mechanism regardless of protrusions thereon.

In accordance with the present invention there is provided a cargo containing means suitable for usage in a pre-loaded cargo system comprising, in general, a box structure having means on the bottom thereof for allowing the box to be slid on the floor of a cargo compartment which are configured to accommodate various protrusions affixed to the floor. The protrusions serve as friction reducing devices such as rollers or skids for example. This latter means includes a receptacle detachably engageable with a pin means carried by a conveyor means employed to automatically position the box within the cargo compartment. Furthermore, a plurality of connectors are carried about the box which are readily connectable with lifting means of a mechanical hoist employed for raising the box to the level of the cargo compartment floor.

Therefore, it is an object of the present invention to provide a novel container for stowing parcels or the like which includes means carried on the bottom of the container coacting with projections, such as roller balls or skids affixed to the floor of the cargo compartment so that the container may be manually or automatically positioned within the compartment without encountering relatively high frictional forces generated between the box bottom and the floor surface.

Another object of the present invention is to provide means whereby the container may be positioned either transversely or longitudinally with respect to the cargo compartment regardless of the placement of a plurality of friction reducing devices, such as roller ball skids, so that the means associated with transverse positioning of the container will not interfere with the means associated with longitudinal positioning of the container.

Another object of the present invention is to provide a latching means on the bottom of the container adaptable to receive means carried by a conveyor system which fastens the conveyor to the bottom of the container and serves to support the container within the cargo compartment.

Still a further object of the present invention is to provide a plurality of buttons on the container engageable with lifting means carried by a suitable hoist so that the container may be detachably connected with said hoist in either a lower or elevated condition with respect to the cargo compartment floor.

A further object of the present invention is to provide a container of special configuration so as to mate with the interior configuration of its associated cargo compartment.

These objects and features are described in the following specification with reference to the accompanying drawings in which:

FIGURE 2 is a transverse sectional view of the airplane shown in FIGURE 1 taken in the direction of arrows 2—2 illustrating the configuration of the cargo compartment and container, compartment floor and a conveyor means for moving the container;

FIGURE 3 is an enlarged view of the runners, rollers and buttons employed on the container, FIGURE 2, illustrating the relationship of these compartments with the cargo compartment floor including friction reducing means;

FIGURE 4 is a longitudinal sectional view of a portion of the airplane shown in FIGURE 1 illustrating the conveyor means employed to position the container within the cargo compartment and means for detachably connecting the conveyor means to each separate container;

FIGURE 5 is an enlarged view of the means for detachably connecting the conveyor means to each container taken in the direction of arrows 5—5 of FIGURE 2;

FIGURE 6 is an enlarged view of a runner carried by the container opposite the runner show in FIGURE 5 for riding on roller balls during transverse positioning of the container within the cargo compartment;

FIGURE 7 is a bottom view of the receptacle employed to receive the pin means carried by the conveyor means;

FIGURE 8 is a sectional view showing the pin means engaged with the receptacle;

FIGURE 9 is a sectional view taken in the direction of arrows 9—9 of FIGURE 8; and FIGURE 10 is an enlarged fragmentary view taken in the direction of arrows 10—10 of FIGURE 3.

Figure 1:
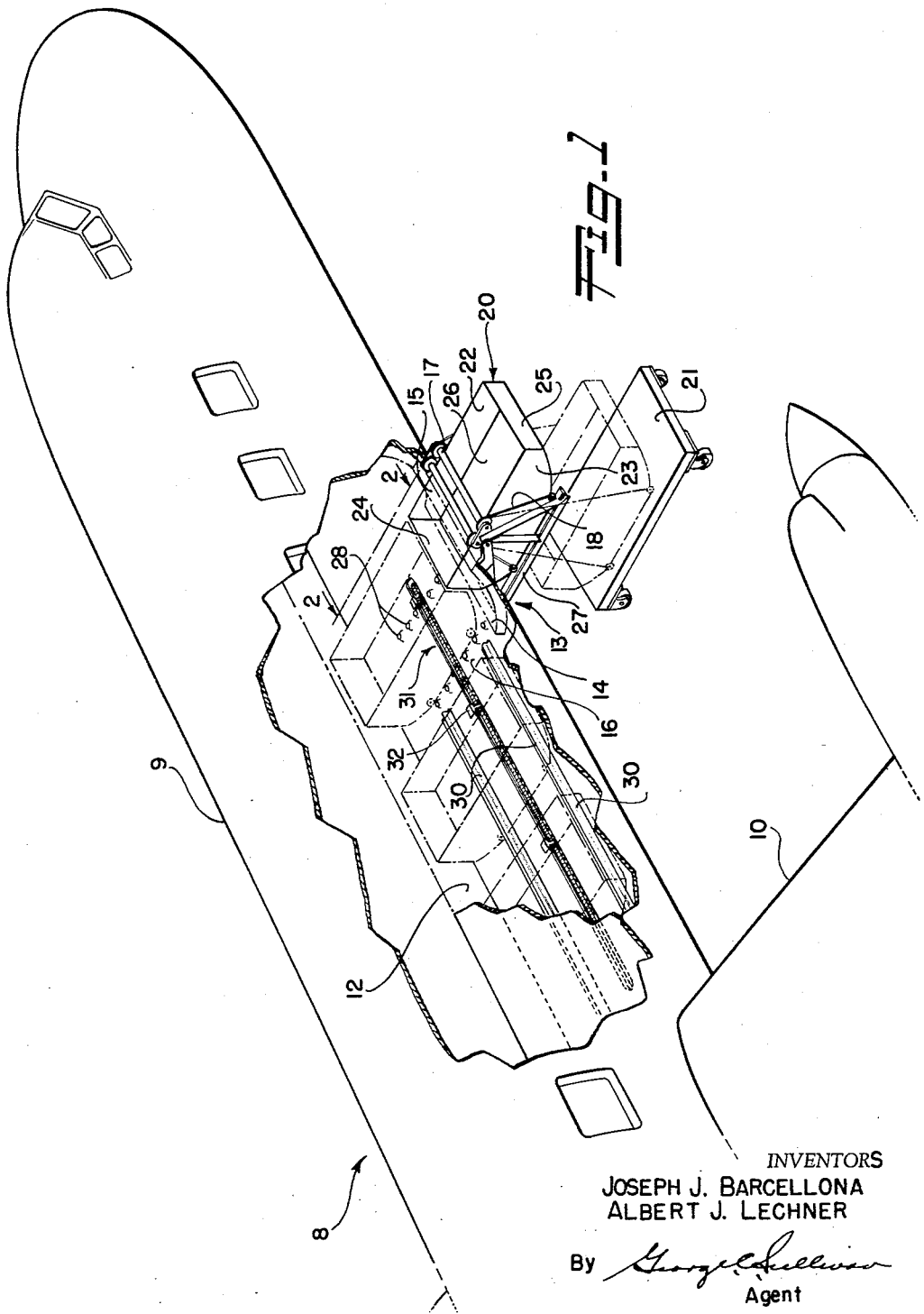
FIGURE 1 is a perspective view of part of an airplane receiving containers of the present invention within a cargo compartment, shown through the fuselage of the airplane, which is furnished with a conveyor system for positioning the container longitudinally with respect to the airplane.

Referring to FIGURE 1, a vehicle represented by a portion of an airplane 8 is shown having an elongated fuselage 9, a wing 10 separated by fuselage 9 and an internal cargo compartment represented by the numeral 12. Cargo compartment 12 communicates exteriorly of fuselage 8 through an opening 13 so that cargo may be moved into and taken out of the cargo compartment 12. Opening 13 is provided with a lower sill 14 and an upper sill 15. Lower sill 14 is constructed substantially even with a floor 16 of the cargo compartment and is suitably constructed to receive a hoist mechanism 17 which may be cantilevered outwardly from opening 13 while being supported on lower sill 14 and upper sill 15.

Hoist 17 is provided with a powered lifting means 18 arranged to fasten onto a container 20, by suitable means to be described with reference to other figures, so that the container may be raised or lowered relative to the ground. Container 20 may be transported to the airplane by means of a cart 21 which is arranged directly beneath the hoist mechanism 17. Each container is of a substantially rectangular shape having sides 22 and 23 of longer length than sides 24 and 25. All sides communicate with a common bottom 26. The hoist mechanism is provided with suitable means, not shown, for powering the lifting means 18 so that container 20 may be easily elevated with respect to cart 21 to substantially the same elevation of the cargo floor 16.

The hoist is further provided with track means 27 which are adaptable to receive a container upon the containers being elevated to the level of the cargo floor. When the container is suitably arranged on the track means, the lifting means may be disconnected from the container and the container may be manually pushed into the cargo compartment. The floor 16 of the cargo compartment is provided with a plurality of friction reduction devices so that the container may be suitably positioned therein without encountering relatively large frictional forces between the surface of the floor and the container bottom. These friction reducing devices comprise a plurality of roller balls 28 being arranged to engage with the container when the container is pushed transversely with respect to the fuselage of the airplane and further comprises a plurality of skids, such as skids 30, which engage the bottom of the container when the container is moved longitudinally within the cargo compartment.

In order to automatically position the container longitudinally within the cargo compartment, a power operated conveyor means 31 is provided which includes a plurality of pin means 32 which engage with a receptacle means carried on the bottom of the container so that the container follows the movement of the conveyor means.

It is to be noted that the hoist mechanism and cart as shown in FIGURE 1 represent only a suitable means for transporting containers to the airplane and a suitable means for lifting the container to the level of the cargo compartment floor so that the container may be transversely positioned therein. The hoist mechanism does not form a part of the present invention and is mentioned only by way of illustration since other means or mechanisms may be employed. Furthermore, the cargo compartment as shown in FIGURE 1 is of sufficient size to hold more than one container and the conveying means for positioning the containers longitudinally with respect to the fuselage of the airplane is provided with means to position a plurality of containers as well as a single container.

With reference to FIGURE 2, cargo compartment 12 is shown as being defined by walls 33 and 34 extending longitudinally within the fuselage 10 of the airplane and being joined by a semi-circular bottom 26. The configuration of the cargo compartment is followed by the container shape so that maximum space within the compartment can be employed for cargo storage. Cargo compartment floor 16 is supported to the fuselage by means of a plurality of supports, such as support 36, which is substantially level with lower sill 14 of opening 13. The plurality of roller balls 28 is carried by floor 16 by means of mounts 37 suitably secured to the floor. A support member 38 is provided in spaced relationship with floor 16 and covers the entire floor. This member is provided with a plurality of apertures through which roller balls 28 project and is additionally provided with a pair of projections representing skids 30 which extend the full length of the cargo compartment. The skids are supported on floor 16 by means of members 40 which also serve to support the ends of member 38 while additional support is provided between members 40 by permitting member 38 to rest upon roller ball mountings 37. A plurality of stiffeners 41 are suitably fastened to member 38 which extend the full length of the cargo compartment and are employed to support the container with the cargo compartment. It is to be noted that the roller balls are unevenly spaced with relationship to each other and further arranged so that they are not in alignment with the stiffeners attached to member 38.

A recess 43 is provided in the center of member 38 in order to accommodate the action of the conveyor system 31 which will be described with reference to other figures.

As shown in FIGURES 2 and 3, container 20 comprises a basic shell having parallel sides 22 and 23 and parallel sides 24 and 25 coupled together by the common bottom 26. Preferably, the shell is fabricated by employing several layers of fiberglass lamina which are laid against a mold (not shown) in a non-rigid condition. The edges of various adjacent lamina of fiberglass are bonded together by well-known processes of applying heat and pressure to the lamina. This process provides a shell in which all of its sides and bottom are integrally bonded together to form a one-piece shell of light weight construction. In the present instance, the shell is reinforced by bonding additional lamina strips 44 at spaced intervals about the periphery of the shell. The strips are bowed so that only their ends engage the outer periphery of the shell and the ends of the strips are made integral with the siding by heating the edges under pressure so that the edges adhere to the siding. This construction forms a hollow portion (not shown) between the interior of the bowed portion of the strips and the exterior surface of the siding of the shell. A lid 29 may be employed as a covering for the individual parcels stowed in the container.

Following the molding of the shell and inclusion of the reinforcing strips thereto, the container may be cured by exposure to sunlight or given heat lamp treatments so that the fiberglass becomes rigid.

In a similar fashion to strips 44, a reinforcing strip 45 is provided on each side 22 and 23 which extend parallel thereto from the siding around the bonded corner to the bottom 26. The strip is provided with a hollow portion 46, shown in FIGURE 5, and is firmly attached to the shell by means of screws 47 in addition to the bonding process employing heat and pressure as described above. Each strip 45 is provided with a metallic runner 48 which is secured to the strip by means of a plurality of screws such as screw 50.

Each runner 48 extends parallel to sidings 22 and 23 along the length of flat bottom portion 51 of the substantially semi-circular bottom 26. Each runner is provided with a concave surface 52 opposite to its connection to strip 45 which is employed to engage the periphery of roller balls 28 during transverse movement of the container within cargo compartment 12.

Parallel sides 22 and 23 are further provided with a pair of buttons 53 and 54 secured to the respective sides by means of fasteners 55. These buttons are employed when lifting means 18 are attached or detached from the container during hoisting operations.

Adjacent the opposing ends of runners 48, there is attached to the bottom of the container a member 56, as shown in FIGURE 6, which includes a concave surface 57 in alignment with the concave surface of the runners, engageable with the periphery of roller balls 28, a roller 58 is engageable with the periphery of skids 30, as shown in FIGURE 3, so that the container may be moved longitudinally within the fuselage. Member 56 is secured to the bottom of the container by means of screw and nut arrangements 61.

Referring to FIGURE 4, a conveyor system is shown represented by arrow 31 for suitably moving the containers longitudinally within the fuselage. The conveyor means comprises a pulley 65 mounted to the fuselage by a bracket 66 which passes through an aperture 67 in member 38 and a powered sprocket 77 employed for driving a double chain 71. The sprocket 70 and its associated chain 71 passes through an aperture 72 provided in member 38. Inasmuch as only half the full length of chain 71 need be driven by sprocket 70, the normally remaining chain which would form an endless chain is replaced by a cable 73 and joined to the chain by a turnbuckle means 74. Thereby cable 73 rotatably rides on pulley 65 and a considerable saving in weight is derived.

The conveyor means is provided with a plurality of pins 75 which is T shaped having the bottom portion of the T integral wtih the chain by forming a link therewith. As shown in FIGURES 7 and 8, a receptacle 77 is secured to the flat portion 51 of the container bottom 26 by means of a plurality of fasteners, such as fastener 78. Receptacle 77 is provided with a T shaped slot 80 which is of suitable size to receive the T shaped pin 75. As shown in FIGURE 9, the pin 75 is provided with a pair of tapered surfaces 81 and 82 which coact as guiding means to insure proper alignment (and engagement) of the pin within the receptacle. Fasteners 78 are embedded into a built-up thickened portion of fiberglass lamina on the flat portion 51 of the bottom 26 as described in accordance with the process previously described.

With reference to FIGURE 10, member 56 is shown provided with a concave portion 83 in alignment with the concave surface 52 of runner 48. Portion 83 is also provided with a cut-out 84 of concave shape perpendicular to the concave portion 83 in alignment with concave surface 52 of runner 48. This perpendicular cut-out is provided so that the container may be moved either transversely or longitudinally, at right angles, without the roller balls encountering interference with edges of runners. The same type of cut-out arrangement is provided at predetermined points along the runners 48. Runners 48 are further provided with notched portions, such as notch 85 in FIGURE 10. Cut-out 85 is provided so that the container may be positioned longitudinally within the cargo compartment in a manner so that stiffeners 41 do not interfere with the travel of the container by encountering interference with the runners.

In actual operation, one or more containers are loaded with individual parcels, such as passenger personal baggage, and then the containers are placed on a cart such as cart 21 shown in FIGURE 1. The cart may be manually or automatically brought to the transport vehicle for loading. The hoist mechanism may then be fastened to the airplane and cantilevered from the fuselage thereof on upper and lower sills 14 and 15 respectively. Lifting means 18, powered by a suitable source carried by hoist 17, are lowered and attached to buttons 53 provided on the sides of the container. The hoist mechanism is actuated so that the lifting means elevates the container with respect to the ground or cart 21. Just prior to the lid of the container reaching lower sill 14, one side of the container is lifted, such as by manual means, so that its associated runner 48 can rest upon a track 27 on a hoist mechanism followed by a manual raising, for example, of its opposite sides so that its associated runner 48 will rest on a track 27 associated with the opposite side of the hoist. At this point lifting means 18 may be disconnected from the plurality of buttons 53 and the container may be manually pushed through opening 13 of cargo compartment 12.

Upon the entrance of the container into opening 13, concave surfaces 52 associated with runners 48 engage with the periphery of roller balls 28 carried by the cargo floor 16. As the container progresses into the cargo compartment, pins 75 carried by the conveyor stand ready to be received into slot 80 of receptacle 87. Transverse positioning of the container is restricted by the abutment of side 24 with compartment wall 34. At this time pin 75 is received within receptacle 77 and sprocket wheel 70 may be actuated to move chain 71 and hence move pin 75 carrying the container.

As the powered sprocket 70 actuates chain 71 to move pin 75 and container 20 longitudinally within the cargo compartment, the support of the container is transferred from the roller balls to skids 30 via rollers 58 carried by the container. Support is also offered to the containers by means of stiffeners 41 engaging with the cut-out portion such as cut-out 85 provided in runners 48.

During the initial longitudinal movement of the container by conveyor system 31, roller balls 28 ride out of engagement with surface 52 of respective runners 48 by means of cut-outs such as cut-out 84. Because of the necessity of various cut-outs for roller balls 28 and stiffeners 41, it is noted that during transverse positioning of the container no more than one roller ball is out of contact with concave surface 52 of runners 48 at a given time. This is due to the uneven spacing of the roller balls.

Having described only typical forms of the invention we do not wish to be limited to the specific details herein set forth, but wish to reserve to ourselves any variations or modifications that may appear to those skilled in the art and fall within the scope of the following claims.

We claim:

1. Apparatus for stowing cargo within the confines of a stowage compartment comprising antifriction devices, aligned transversely on the compartment floor and a pair of parallel skids on the floor of the compartment at right angles of the antifriction devices, a box-like structure having a plurality of sides joined together by a common bottom, the sides having a particular configuration adaptable to fit within the stowage compartment, continuous parallel runner means attached to the bottom of the structure separating the bottom from the floor of the compartment, and each runner means having a concave surface extending its full length in slidable engagement with the antifriction devices, during transverse positioning of the structure within the compartment, the runner means having cut-out portions to pass the skids to permit longitudinal positioning of the structure.

2. Apparatus for stowing cargo within the confines of an elongated stowage compartment comprising antifriction devices aligned transversely on the compartment floor and a pair of parallel skids on the floor of the compartment at right angles of the antifriction devices, a box-like structure having a plurality of sides joined together by a common bottom, the sides having a particular configuration adaptable to fit within the stowage compartment, continuous parallel runner means attached to the bottom of the structure separating the bottom from the floor of the compartment, each runner means having a concave surface extending its full length in slidable engagement with the antifriction devices during transverse positioning of the structure within the compartment, and roller means carried on selected sides of the structure arranged to support the structure on said skids during longitudinal positioning of the structure.

3. Apparatus for stowing cargo within a stowage compartment comprising a plurality of friction reducing devices aligned transversely on the compartment floor and a pair of parallel skids carried on the floor of the compartment at right angles to the friction reducing devices, a box-like structure having a plurality of sides joined together by a common bottom, the sides having a particular configuration adaptable to fit within the stowage compartment, continuous parallel runner means attached to the bottom of the structure separating the bottom from the floor of the stowage compartment, each runner means having a concave surface extending its full length in slidable engagement with the friction reducing devices, and a plurality of openings provided in the runner means whereby the structure may be positioned at right angles to the parallel runner means over said skids within the cargo compartment.

4. Apparatus for stowing cargo within an elongated stowage compartment comprising a plurality of friction reducing devices aligned transversely on the compartment floor and a pair of parallel skids on the floor of the compartment at right angles to the friction reducing devices, a box-like structure having a plurality of sides joined together by a common bottom, the sides having a particular configuration adaptable to fit within the stowage compartment, continuous parallel runner means attached to the bottom of the structure separating the bottom from the floor of the stowage compartment during transverse positioning of the structure within the compartment, each runner means having a concave surface extending its full length, a plurality of openings provided in the runner means whereby the structure may be positioned at right angles to the parallel runner means over the friction reduction devices within the cargo compartment, and a plurality of rollers carried on selected sides of the structure arranged to support the structure on said skids during longitudinal positioning of the structure.

5. Apparatus for stowing cargo within the confines of an elongated stowage compartment comprising antifriction devices aligned transversely on the compartment floor and a pair of parallel skids on the floor of the compartment at right angles of the antifriction devices, a box-like structure having a plurality of sides joined together by a common bottom, the sides having a particular configuration adaptable to fit within the stowage compartment, parallel runner means attached to the bottom of the structure separating the bottom from the floor of the compartment, conveying means partially projecting through the floor of the compartment for mechanically positioning the structure longitudinally within the compartment, each runner means having a concave surface extending its full length in slidable engagement with the antifriction devices during transverse positioning of the structure within the compartment, means secured to the bottom of the structure detachably connectable with the conveyor means and roller means carried on selected sides of the structure arranged to support the structure on said skids during longitudinal positioning of the structure.

6. Apparatus for stowing cargo within a stowage compartment of an airplane comprising a plurality of friction reducing devices aligned transversely on and carried on the floor of the compartment, a box-like structure having a plurality of sides joined together by a common bottom; the sides having a particular configuration adaptable to fit within the stowage compartment, parallel runner means attached to the bottom of the structure for supporting the structure on the floor of the stowage compartment; conveying means for positioning the structure longitudinally within the compartment comprising, a powered sprocket supported beneath the floor, a pulley wheel operably connected to the sprocket by a chain means, and a plurality of pin means secured to the chain means; each runner means having a concave surface extending its full length in slidable engagement with the friction reducing devices, a receptacle affixed to the bottom of the structure detachably connected with the pin means, and a plurality of openings provided in the runner means whereby the structure may be positioned at right angles to the parallel runner means over the friction reduction devices wtihin the cargo compartment.

7. A container adapted to be positioned in a transverse and longitudinal direction within an airplane cargo compartment comprising, rollers on the floor of the compartment in the transverse direction and skids on the floor of the compartment extending in the longitudinal direction at right angles to the rollers, a box-like structure having a plurality of sides joined by a common bottom, continuous runner means secured to the bottom of the structure slidably engageable with the rollers during transverse positioning of the container, means affixed to the sides of the structure engageable with said skids during transverse positioning of the container, and the runner means having a plurality of cut-out portions arranged adjacent said skids and rollers when the container has been fully positioned transversely so that the runner means does not interfere with the longitudinal positioning of the container.

8. The invention as defined in claim 7 wherein longitudinal positioning of the container is achieved by a conveyor means, and latching means fastened on the bottom of the structure detachably connected to the conveyor means whereby the container is secured within the airplane cargo compartment.

References Cited in the file of this patent
UNITED STATES PATENTS

| | | |
|---|---|---|
| 1,648,301 | Fitch | Nov. 8, 1927 |
| 2,048,960 | Tiedemann | July 28, 1936 |
| 2,334,124 | Peterson | Nov. 9, 1943 |
| 2,858,774 | Batten | Nov. 4, 1958 |

OTHER REFERENCES

"Flight," magazine (page 218), Aug. 24, 1951.
"Aero Digest," magazine, Nov. 15, 1945 (pages 77, 121 and 122).